United States Patent
Gilmore

Patent Number: 5,918,621
Date of Patent: Jul. 6, 1999

[54] AUTOMATIC, PRESSURE-SENSITIVE, INDEPENDENT ZONE, DIVERTER CHECK VALVE

[76] Inventor: Dan Gilmore, 402 Stirrup Ct., Roseville, Calif. 95661

[21] Appl. No.: 08/614,320

[22] Filed: Mar. 12, 1996

Related U.S. Application Data

[63] Continuation-in-part of application No. 08/331,131, Oct. 28, 1994, abandoned.

[51] Int. Cl.⁶ .................................................. G05D 7/01
[52] U.S. Cl. ...................................... 137/87.01; 137/110
[58] Field of Search ................... 137/87.01, 94, 137/110; 91/420

[56] References Cited

U.S. PATENT DOCUMENTS

| | | | |
|---|---|---|---|
| 1,257,070 | 2/1918 | Discher | 137/87 X |
| 1,287,258 | 10/1918 | Discher | 137/87 X |
| 1,339,798 | 5/1920 | Thompson | 137/87 X |
| 2,401,258 | 5/1946 | Livers | 91/420 X |
| 3,572,850 | 3/1971 | Schultz | 303/84 |
| 3,858,607 | 1/1975 | Baker | 137/625.5 |
| 4,177,840 | 12/1979 | Neff | 137/599 |
| 5,040,559 | 8/1991 | Ewing | 137/1 |
| 5,133,386 | 7/1992 | Magee | 137/625.65 |
| 5,271,428 | 12/1993 | Dunn | 137/509 |

Primary Examiner—Stephen M. Hepperle

[57] ABSTRACT

An automatic pressure activated diverter valve with check valve action, made from pressure rated components, that provides flow from one or more independent flow lines to outside storage tank and back to flow line when the flow line is pressurized, without affecting unpressurized zones.

1 Claim, 2 Drawing Sheets

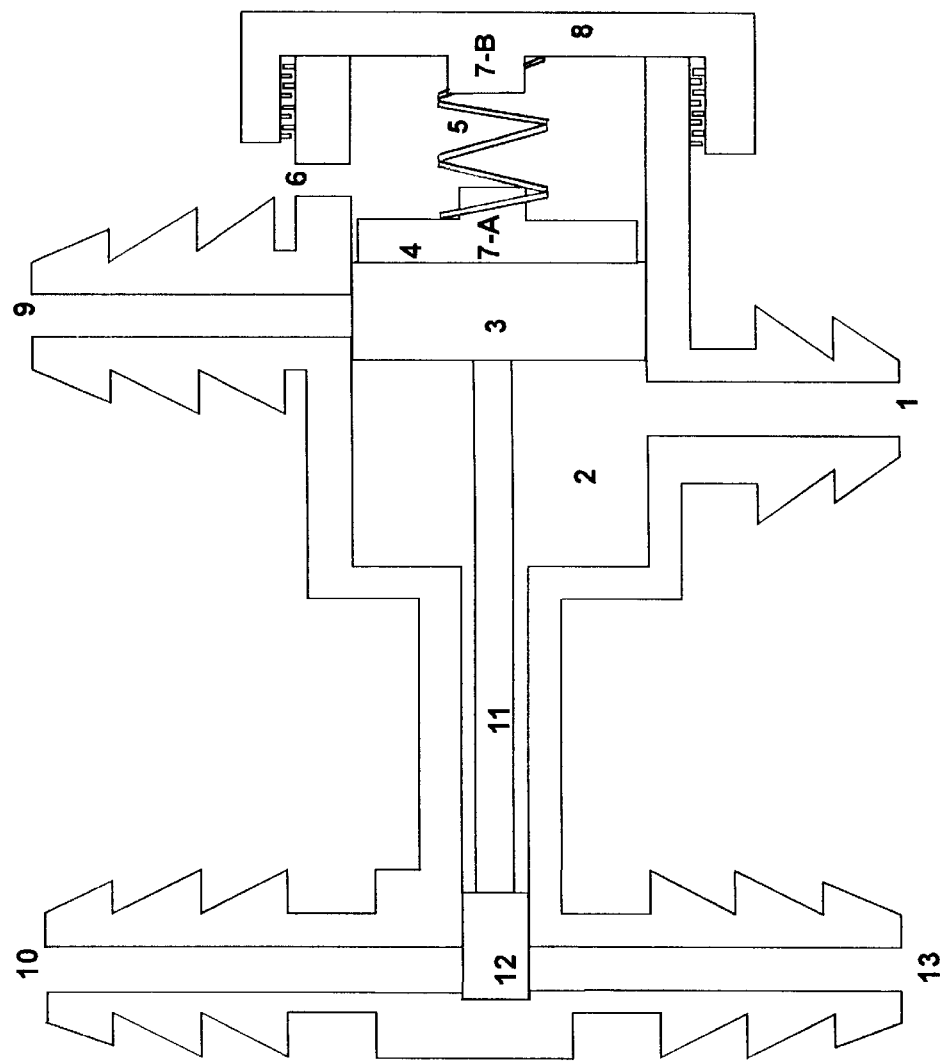

AUTOMATIC, PRESSURE-SENSITIVE, INDEPENDENT ZONE, DIVERTER CHECK VALVE

This application is a continuation in part of Ser. No. 331,131, filed Oct. 28, 1994, now abandoned.

BACKGROUND

1. Field of Invention

This invention relates to automatic valves, specifically to the independent opening and closing of flow ports from system pressure applied to one port, with back flow protection created against pressure applied to any other ports, allowing the independent operation of multiple sprinkler zones with one fertilizer storage tank.

2. Description of Prior Art

The initial use of this product would be to enable a multiple zone irrigation system to use one fertilizer storage tank, to inject fertilizer independently to all sprinkler zones, when connected to the downstream or non-pressure side of the sprinkler zone valve. This is accomplished by opening a flow outlet and inlet port to the fertilizer storage tank, when the sprinkler zone valve is opened and the sprinkler zone is pressurized, without allowing flow into the sprinkler zones that are not open, as well as not allowing back pressure from the tank or opened zones to affect the predetermined opening pressure required to open the valve.

Various methods of central sprinkler fertilizing units have been developed, but due to backflow prevention requirements, one unit had to be attached to each zone when a zone valve with an atmospheric vacuum breaker was used. Some of the disadvantages related to that are the additional cost of additional units and the added time required to monitor and fill each individual unit. Also, the prior installation was complicated by the fact that the unit must be six inches below the vacuum breaker to meet code requirements. This meant piping would have to be changed to accommodate the addition of the tank assembly.

The only other means of using only one fertilizer storage tank for a multiple zone sprinkler system, that complies with back flow prevention codes would require connecting to the sprinkler main line before the zone valves and installing a reduced pressure backflow preventer or pressure vacuum breaker, depending on the plumbing code requirements of the specific area. This can be very expensive and labor intensive.

The U.S. Pat. No. 3,572,850, pressure responsive splitter valve by Harold B. Schultz uses multiple flow ports within a closed loop system to maintain a pressure balanced system. It does not create an engineered unbalanced system which is required to accomplish the flow requirements of my invention.

The U.S. Pat. No. 5,271,428, adjustable differential pressure valve by Charles S. Dunn uses an adjustable pressure differential to open flow to multiple ports. It does not open a return port which is required in the application performed by my invention.

The U.S. Pat. No. 5,040,559, modulating positive shutoff mechanism by James H. Ewing is designed to control flow through singular import and output ports. It does not open multiple ports to divert flow and allow for reinjection into the flow line, which is required to accomplish the flow requirements of my invention.

The U.S. Pat. No. 3,858,607, three-way, two-position diverter valve by William J. Baker uses an actuator to divert flow through multiple ports. It requires an actuator with outside power source and does not allow for inlet and outlet ports, but deals with outlet ports only, where my invention does not require outside power to open the ports and allows both inlet and outlet flow.

The U.S. Pat. No. 4,177,840, pressure regulation and flow control valve with combination needle and check valves by James A. Neff regulates flow and pressure in one flow through port. It does not divert flow to other inlet and outlet ports to create opening and closing independent zones which is necessary to meet the flow requirements of my invention. The U.S. Pat. No. 5,133,386 balanced, pressure-flow-compensated, single-stage servovalve by Garth L. Magee maintains a balanced flow through the use of multiple ports within a closed system. It accommodates inlet and outlet flow for pressure balance only. It does not allow independent flow to an outside source and reinjection to the original flow which is required to meet the flow requirements of my invention.

The U.S. Pat. No. 1,287,258 automatic valve by Edward William Discher is designed to open two inlet ports at a predetermined pressure allowing flow unless the inlet pressure falls below the predetermined level. It does not stop back flow in that it would open when there is adequate back pressure to overcome the spring pressure because the valve seal 12 is exposed to back pressure through port 14. Back pressure against valve seal 20 would also increase the amount of pressure required in the inlet port to open the valve. My invention will not open from back pressure and back pressure will not affect the amount of pressure required to open my valve. This is required to meet the flow requirements of my invention in that back flow from opened zones cannot be allowed to enter unopened zones and back pressure from cannot interfere with the opening of the valve when it is pressurized as the zone opens.

The U.S. Pat. No. 1,257,070 automatic valve by Edward William Discher is designed to open two inlet ports at a predetermined pressure allowing flow unless the inlet pressure falls below the predetermined level. It does not stop back flow and would open when back pressure is adequate to overcome the spring pressure because the valve seal 26 is exposed to back pressure from port 9. Back pressure would motivate the valve to move against spring 23, into the open position. Back pressure would increase the amount of pressure required in the inlet port to open the valve because valve seal 22 does not seal cavity 12 from back pressure from port 11 when the valve is in the closed position. In a back pressure condition, pressure would enter cavity 12 from port 11, adding to the pressure applied by spring 23 to maintain the valve in the closed position. My invention will not open from back pressure and back pressure will not affect the amount of pressure required to open my valve. This is required to meet the flow requirements of my invention, in that back flow cannot be allowed to enter unopened zones and back pressure cannot interfere with the opening of the valve when it is pressurized as the zone opens.

My invention solves the problem of multiple sprinkler zones with atmospheric vacuum breakers requiring individual fertilizer dispensing units to meet back flow prevention codes. It enables multiple sprinkler zones to work independently with one storage tank source without the requirement of outside power source. It opens only when a predetermined amount of pressure enters one inlet port as the sprinkler zone opens and is pressurized. It will not open in response to pressure entering any other inlet or outlet ports of the valve. Pressure entering the other inlet and outlet ports will not affect the amount of pressure required to open the valve. This check valve action prevents fertilizer from flowing into unopened sprinkler zones. To my knowledge, this problem hasn't been addressed specifically in the past.

Objects and Advantages

Accordingly, several objects and advantages of my invention are:

(a) Economical installation of an automatic fertilization system where multiple atmospheric vacuum breaker zone valves are used by allowing one tank to supply all sprinkler zones.

(b) Time savings in maintaining the automatic fertilization system once it has been installed due to only one tank requiring refilling and maintenance as opposed to multiple tanks.

(c) Automatic opening of the valve by using the sprinkler system pressure when the zone valve is opened without the need of an outside power source.

(d) Automatic closing of the valve when the zone valve is closed and there is no pressure in the sprinkler zone, preventing the flow of fertilizer into the closed zone when other sprinkler zones are open.

(e) Additional backflow protection against fertilizers contaminating the potable water supply by closing automatically when the sprinkler zone is closed and not opening from back pressure.

(f) Adapts to any size application.

(g) Adapts to any pressure and flow requirements.

(h) Provides an injection delay when the sprinkler zone initially opens creating more even fertilizer injection and fertilizer coverage.

(i) Adapts to a wide range of installation variables such as low pressure and high pressure zones being connected to the same tank.

Further objects and advantages are to provide this product's capabilities to the consumer in an economical, easily manufactured product. Still further objects and advantages will become apparent in ensuing drawings and description.

DRAWINGS FIGURES

FIG. 2 shows the internal working parts of the invention.

Reference Numerals in Drawings

Figure 1:
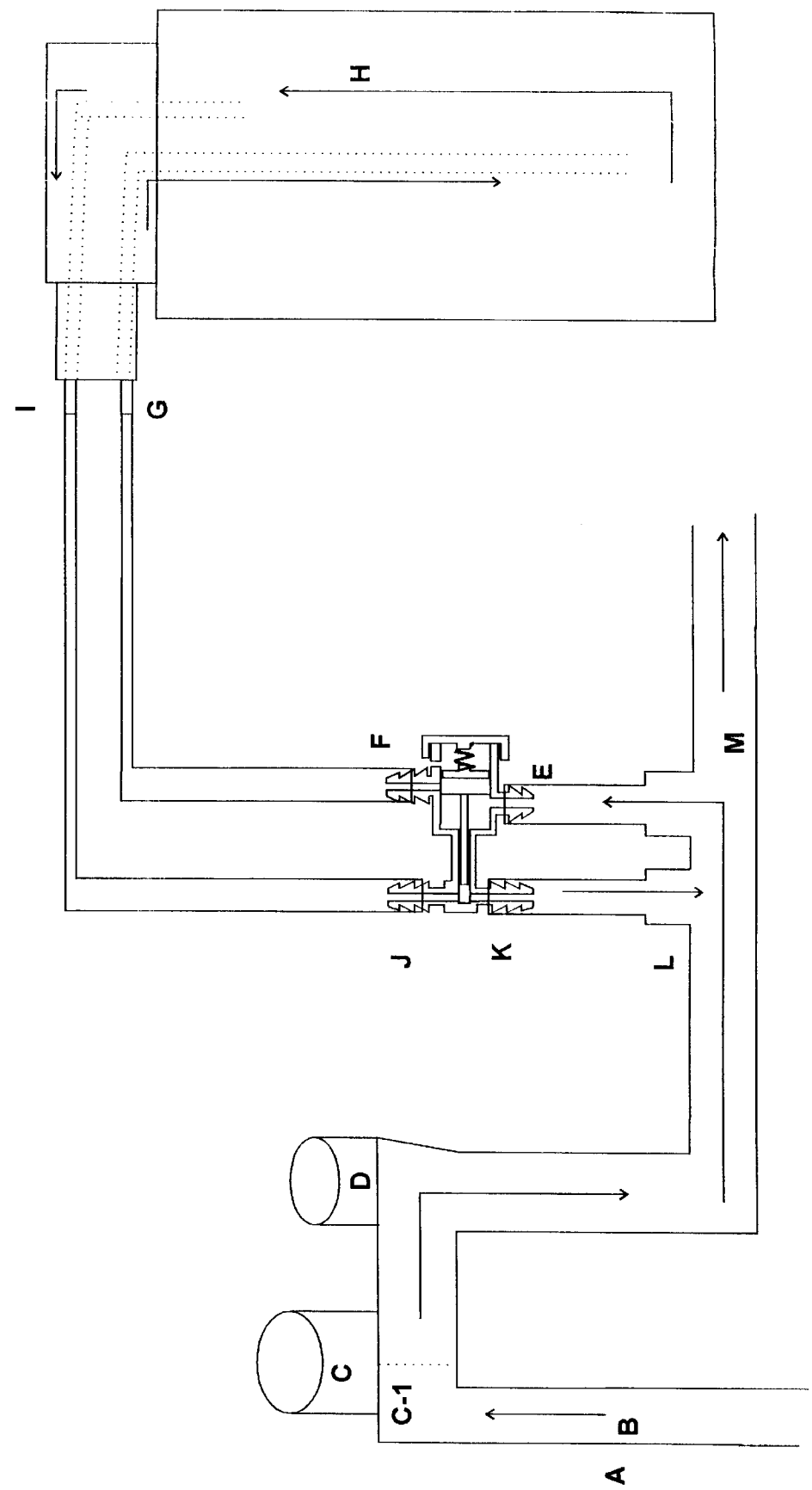
FIG. 1 shows an overview of the invention and how it connects to a multiple zone sprinkler system.

FIG. 1
  A. Zone Flow Line
  B. Flow Direction
  C. Zone Valve
  C1. Valve Disc
  D. Atmospheric Vacuum Breaker
  E. Supply Side Diverter Inlet Connection
  F. Supply Side Diverter Outlet Connection
  G. Supply Side Connection to Storage Tank
  H. Storage Tank
  I. Return Connection to Return Side of Tank
  J. Return Connection To Return Side of Diverter Valve Inlet
  K. Return Connection to Return Side Diverter Valve Outlet
  L. Return Connection to Return Side Zone Flow Line
  M. Zone Flow to Sprinklers
  N. Inlet Venturi
  O. Outlet Venturi FIG. 2
  1. Supply Side Inlet Port
  2. Inlet Port Cavity
  3. Valve Seal
  4. Valve Plug
  5. Spring
  6. Breather Port
  7a. Valve Stop
  7b. Valve Stop
  8. End Cap
  9. Supply Side Outlet Port
  10. Return Side Inlet Port
  11. Valve Shaft
  12. Return Port Seal
  13. Return Side Outlet Port
  14. Connection Cavity

DESCRIPTION OF INVENTION

FIG. 1 shows the basic view of the invention and how it connects to a sprinkler system. The unit can be manufactured from various types of plastic or metal, or both. Plastic connections can be threaded, glued or both. The metal connections can be threaded, welded or braised.

FIG. 2 shows the units inner parts and how they associate with the valve housing. The valve consists of a housing with supply and return ports in which the supply port is significantly larger than the return port, as shown in FIG. 2. This housing is designed to accommodate the valve's inner components.

The valve inlet port 1 connects inlet port cavity 2, to sprinkler zone flow line A. Valve inlet port 1 is open to inlet port cavity 2 when the valve is in the open and closed position.

Inlet port cavity 2 is positioned between supply side inlet port 1 and supply side outlet port 9, directly opposite to the return side of the valve. Inlet port cavity 2 houses valve plug 4, seal 3 and spring 5.

Valve seal 3 is on the outer diameter of valve plug 4. It engages inlet port cavity 2 behind inlet port 1, so inlet port 1 is open to inlet port cavity 2, when the valve is in the closed position. Valve seal 3 engages inlet cavity 2 both in front of and behind supply side outlet port 9 when the valve is in the closed position. Supply side outlet port 9 is on the opposite side of inlet port 1, offset from supply side inlet port 1 to establish inlet port cavity 2 and sealing of supply side outlet port 9 when the valve is in the closed position. Supply side outlet port 9 connects to the supply port of the fertilizer storage tank G.

Valve seal 3 moves behind supply side outlet port 9 against spring 5 when valve moves to the open position. Valve seal 3 maintains a seal against inlet port cavity 2 as the valve moves to the open position. Valve seal 3 is in contact with inlet port cavity 2 throughout the length of the seal against supply side outlet port 9. When moving to the open position, valve seal 3 stops prior to engaging breather port 6, so breather port 6 is open when the valve is in both the open and closed position.

Valve plug 4 is on the supply side of the valve, connected to the return side of the valve and the return seal 12 by valve shaft 11.

Spring 5 is positioned between valve plug 4 and end cap 8, in a slightly compressed or loaded condition.

Valve stop 7A is on the back side of valve plug 4 and valve stop 7B is on the front side of end cap 8. Valve stop 7A and 7B are centered on the valve plug 4 and end cap 8 and extend inside spring 5.

End cap 8 is attached to the diverter housing at the end of the supply side. Breather port 6 is on the back side of valve plug 4 when the valve is in the open position so breather port 6 is always open to the atmosphere.

Valve shaft 11 connects valve plug 4 on the supply side of the valve to return port seal 12 on the return side of the valve. Valve shaft 11 moves through connection cavity 14, as the valve moves between the open and closed positions.

The valve seal 3 is on the outer diameter of valve plug 4. It engages inlet port cavity 2 behind inlet port 1, behind and in front of outlet port 9 when in the closed position, and behind outlet port 9 in the open position.

Return side inlet port 10 and return side outlet port 13 are on the return side of the valve, directly adjacent to each other. Return side inlet port 10 connects to the fertilizer storage tank return port I. Return side outlet port 13 connects to return connection to return side zone flow line L.

Return port seal 12 is located between the inlet port 10 and the outlet port 13 on the return side of the valve. It is connected to valve seal 3 and plug 4 by valve shaft 11. Return port seal 12 extends from return side inlet port 10 and return side outlet port 13 into connecting cavity 14 when the valve is in the closed position. In the open position, return port seal 12 moves into connecting cavity 14 and out of return side inlet port 10 and return side outlet port 13.

Operations—FIGS. 1, 2

The manner of operating The Automatic Diverter Check Valve is to attach it to a sprinkler system zone with a zone valve C using an atmospheric vacuum breaker D for back flow protection. It is attached to the down stream side of the valve which is the non-pressure side of the valve when the sprinkler zone valve is closed. Attach the supply side inlet port 1 and return side outlet port 13 to the zone flow line. Attach supply side outlet port 9 to supply side connection to storage tank G. Attach return connection to return side of storage tank I to return side inlet port 10.

When the sprinkler zone valve C opens, zone flow to sprinklers M is allowed. This flow pressurizes the sprinkler zone. This pressure is motivated to enter the diverter check valve by a venturi N or other well know means of creating differential pressure.

The pressure enters inlet port cavity 2 through inlet port 1. Inlet port 1 is open to inlet port cavity 2 when the valve is in the closed position. When pressure achieves a predetermined level, it motivates the assembly of valve plug 4, valve seal 3, valve shaft 11 and valve seal 12 to move to the open position. This is accomplished by creating an engineered unbalanced condition between the supply side and return side of the valve, by making the supply side significantly larger than the return side.

Inlet port cavity 2 provides a cavity for the reception of pressure from the sprinkler zone when it is opened and a housing for valve plug 4, valve seal 3 and spring 5 to move within as the valve moves between the open and closed positions.

Valve seal 3 maintains a seal between supply side outlet port 9 and inlet port cavity 2. Valve seal 3 extends both to the front and back sides of supply side outlet port 9 to prevent back flow from other open sprinkler zones or tank pressure from entering inlet port cavity 2 on either side of valve plug 4, when the valve is in the closed position. Valve seal 3 maintains a flush seal against inlet port cavity 2 in the open position to prevent flow behind valve plug 4 and out breather port 6. Valve seal 3 is flush against the inlet port 2 sealing surface which neutralizes the affect of any back pressure coming from supply side outlet port 9. This sealing action prevents back pressure in supply side outlet port 9 from motivating the valve to move to an open position or creating resistance to the valve moving to an open position when pressurized from the sprinkler zone opening and pressure entering through inlet port 1. This means the predetermined opening pressure is not affected by back pressure from supply side outlet port 9.

Valve plug 4 is significantly larger than valve seal 12, creating an engineered unbalanced condition. It attaches to valve shaft 11 which is connected to valve seal 12. When the sprinkler zone is opened and pressure is exerted on valve plug 4, it motivates valve plug 4 to move against spring 5. This movement moves valve seal 3 behind supply side outlet port 9 opening up a flow path from supply side inlet port 1 and supply side outlet port 9 to the fertilizer storage tank. This movement moves return port seal 12 into connecting cavity 14, allowing flow from return side inlet port 10 to return side outlet port 13. When the sprinkler zone closes, there is no pressure entering inlet port 1 enabling the pressure of spring 5 on valve plug 4 to motivate the valve to the closed position.

Spring 5 maintains pressure on valve plug 4, motivating the valve to stay in the closed position. The spring is in a normally loaded or slightly compressed condition which maintains a predetermined measured pressure motivating the valve to a normally closed position. The opening pressure can be adjusted by adjusting the weight or load of the spring.

Valve stop 7A and 7B project inside the spring 5 to maintain the spring in a centered position on valve plug 4. This keeps the spring in proper alignment so pressure is exerted at the center of valve plug 4 and throughout the assembly of valve shaft 11 and valve seal 12.

End cap 8 is attached to the end of the supply side of the valve. End cap 8 provides a stationary base for spring 5 as the valve moves between the open and closed positions. End cap 8 prevents pressure from forcing spring 5 and the assembly of valve plug 4, valve shaft 11, return port seal 12 and valve seal 3 out of the diverter valve housing.

Breather port 6 allows the evacuation of air as the valve moves to the open position. It allows the entry of air as the valve moves to the closed position. This prevents valve opening and closing movement from being affected by a vacuum forming or air being trapped behind the valve plug 4 in the inlet port cavity 2. Breather port 6 is behind valve seal 3 when the valve is in the open position so valve seal 3 does not interfere with breather port 6.

Supply side outlet port 9 connects to the fertilizer storage tank. It shares a common flow line with other sprinkler zones connected to the fertilizer storage tank. When the valve is open, supply side outlet port 9 provides means for water from the sprinkler zone to enter the fertilizer storage tank. As this flow goes to the fertilizer storage tank, it will also contact supply side outlet ports 9 on sprinkler zones that are closed. This flow or pressure will enter the other supply side outlet ports 9 on the unopened zones, but valve seal 3 in the other valves will prevent flow into the unopened zones.

Valve shaft 11 connects valve plug 4 to valve seal 12. Valve shaft 11 communicates any movement created by pressure opening the valve or by spring 5 closure of the valve to valve seal 3 and valve seal 12, keeping them in the proper position.

Return side inlet port 10 connects to return connection to return side of tank I of the fertilizer storage tank. Inlet port 10 provides a means for fertilizer coming from the fertilizer storage tank to sprinkler flow line A, when the valve is in the open position. Return side inlet port 10 is directly adjacent to return side outlet port 13.

Valve seal 12 prevents flow in return side inlet port 10, return side outlet port 13 and connection cavity 14 when the valve is in the closed position and when other sprinkler zones are open. Valve seal 12 allows flow in return side inlet port 10 and return side outlet port 13 but does not allow flow in connection cavity 14 when the valve is in the open position. This allows fertilizer to flow to the sprinkler zone while it prevents the mixing of fluids from the supply side and return side of the valve in the open position. Valve seal 12 is flush against return side inlet port 10 so back pressure from other open zones or the fertilizer storage tank will be neutralized preventing it from creating any motivation for the valve to open or any motivation for it to affect the predetermined opening pressure.

Connecting cavity 14 provides a means for valve shaft 11 to connect valve plug 4 and valve seal 12 to respond together as the valve is motivated to an open or closed position. Connecting cavity 14 stays in contact with valve seal 12 when the valve is in both the open and closed positions to prevent any flow between the supply and return side of the valve.

Return side outlet port 13 connects to the sprinkler zone flow line A. It connects to returns side inlet port 10 when the valve is in the open position which allows flow of fertilizer from the fertilizer storage tank and back into the sprinkler zone flow line A. Flow is motivated back into the zone flow line A by venturi O or some other well known means of creating differential pressure.

SUMMARY, RAMIFICATIONS, AND SCOPE

Accordingly, the reader will see that the automatic diverter check valve will provide many advantages to the consumer. It provides a convenient way to use one storage tank to supply multiple zones automatically and comply with mandated plumbing codes.

* it greatly reduces the cost of installation of a centralized fertilization system.
* it greatly reduces the time required to maintain a centralized fertilization system.
* it can be economically produced with existing products.
* it adapts easily to large or small systems at high or low pressures.
* it can be easily adapted to any type of installation or connection requirements.

Although the description above contains many specific examples, these should not be construed as limiting the scope of the invention, but as merely providing illustrations of some of the presently preferred embodiments of this invention. For example, it could be made in virtually any size. It could be fabricated from pipe and piping components, molded plastic, or a variety of products. Even though we have centered primarily on the unit working in a sprinkler system application, it could be adapted to any system where pressure to a specific flow line could be used to open an inlet and outlet to port to another device and when pressure is subsequently turned off, the port closed and check valve actuated.

Thus the scope of the invention should be determined by the appended claims and their legal equivalents, rather than by the examples given.

I claim:

1. A valve enabling one fertilizer storage tank to supply multiple sprinkler zones by allowing fertilizer flow to each sprinkler zone only when the zone valve is open and operating, installed on the non-pressure side of the zone valve when the zone valve is closed, which automatically opens when sprinkler zone valve is opened pressurizing the supply side inlet port and automatically closes when sprinkler zone valve closes and supply side inlet port is not pressurized, will not be motivated to open by back pressure and back flow from other open sprinkler zones, preventing fertilizer flow into zones in which zone valves are closed, will create a fertilizer injection delay in the open zone until the zone is pressurized above a predetermined level, with predetermined opening pressure not affected by pressure on ports other than the supply side inlet port, said apparatus comprising, a housing having flow inlet and outlet ports on a supply and return side, with the supply side being larger than the return side, with valve plugs and seals connected by a valve shaft, moveable simultaneously, with a spring to motivate staying in the closed position, with supply side ports offset to create a cavity between the supply side inlet port and supply side valve seal, with supply side inlet cavity larger than return side cavity creating an engineered unbalanced condition when pressure enters the supply side inlet port motivating the valve to open, with no cavity between the supply side outlet port and the supply side valve seal, with return side ports in alignment with no cavity between inlet or outlet ports and return side valve seal, eliminating any motivation of movement of the valve to the open or closed position, by pressure in any port other than the supply side inlet port, that automatically opens a supply side outlet port and a return side inlet and outlet port when pressurized from the supply side inlet port only, a valve plug and seal in both the supply and return sides creating a seal to prevent flow when in the closed position connected by a valve shaft, a seal in the valve shaft body cavity preventing flow between supply and returns sides, an air vent allowing the evacuation of air when valve is moving to the open position and entry of air when valve moves to the closed position.

* * * * *